(12) United States Patent
Friedrich et al.

(10) Patent No.: US 7,410,536 B2
(45) Date of Patent: Aug. 12, 2008

(54) OXIDATION-STABLE IRON OXIDE PIGMENTS, PROCESS FOR PREPARING THEM AND THEIR USE

(75) Inventors: Holger Friedrich, Krefeld (DE); Herbert Kunstmann, Krefeld (DE)

(73) Assignee: LANXESS Deutschland GmbH, Leverkusen (DE)

( * ) Notice: Subject to any disclaimer, the term of this patent is extended or adjusted under 35 U.S.C. 154(b) by 0 days.

(21) Appl. No.: 11/799,182

(22) Filed: May 1, 2007

(65) Prior Publication Data
US 2007/0266899 A1    Nov. 22, 2007

(30) Foreign Application Priority Data
May 18, 2006   (DE)  .................. 10 2006 023 245

(51) Int. Cl.
*C09C 3/08*    (2006.01)
*C09C 1/24*    (2006.01)
*C01G 49/02*   (2006.01)
*C04B 2/00*    (2006.01)
*C04B 14/30*   (2006.01)
*C04B 20/10*   (2006.01)

(52) U.S. Cl. .................. 106/460; 106/456; 106/459; 106/712; 106/724; 106/727; 106/728; 106/795; 106/808; 106/810; 427/220; 428/403; 430/108.1; 430/108.6; 524/81; 524/284; 524/398; 524/431

(58) Field of Classification Search .................. 106/456, 106/459, 460, 712, 724, 727, 728, 795, 808, 106/810; 427/220; 428/403; 430/108.1, 430/108.6; 524/81, 284, 398, 431
See application file for complete search history.

(56) References Cited

U.S. PATENT DOCUMENTS

| 4,264,462 | A | 4/1981 | Buxbaum et al. ........ 252/62.53 |
| 4,491,619 | A | 1/1985 | Biermann et al. ........... 428/403 |
| 4,913,063 | A | 4/1990 | Jonas et al. ................. 106/413 |
| 5,300,146 | A | 4/1994 | Jonas et al. ................. 106/456 |
| 5,667,579 | A | 9/1997 | Oehlert et al. .............. 106/456 |

OTHER PUBLICATIONS

Ullmann's Encyclopedia of Industrial Chemistry, 5th edition, vol. A20, p. 297, VCH Verlagsgesellschaft mbH, Weinheim 1992, no month.
Ullmann's Encyclopedia of Industrial Chemistry, 5th edition, vol. A20, p. 330, VCH Verlagsgesellschaft mbH, Weinheim 1992, no month.

*Primary Examiner*—Anthony J Green
(74) *Attorney, Agent, or Firm*—Nicanor A. Kohncke

(57) ABSTRACT

The present invention relates to oxidation-stable iron oxide pigments which have a coating of at least one organic substance, to their preparation and to their use.

25 Claims, No Drawings

OXIDATION-STABLE IRON OXIDE PIGMENTS, PROCESS FOR PREPARING THEM AND THEIR USE

CROSS REFERENCE TO RELATED PATENT APPLICATIONS

The present patent application claims the right of priority to German Patent Application No. DE 10 2006 023 245.3 filed on 18 May 2006.

BACKGROUND OF THE INVENTION

1. Field of the Invention

The present invention relates to oxidation-stable iron oxide pigments which have a coating of at least one organic substance, to their preparation and to their use.

Iron oxide pigments containing iron in the +2 oxidation state constitute thermodynamically unstable phases in comparison to iron(III) oxide, $Fe_2O_3$. In the presence of air or oxygen they may undergo full or partial oxidation, for example

$$2Fe_3O_4 + \tfrac{1}{2}O_2 \rightarrow 3Fe_2O_3$$

Such reactions are known, for example, in the case of black iron oxide pigments which correspond in terms of their composition and structure to magnetite. As a result of the oxidation the pigment suffers loss in its most important quality, the color, and hence becomes unusable. The propensity to undergo oxidation increases in line with the degree of fine division and thus with the specific surface area of the pigments.

The same applies to mixtures of black iron oxide with other iron oxide color pigments—red iron oxide and/or yellow iron oxide—as are produced for brown shades.

If with the color pigments it is the loss of coloristic properties that makes them unusable, then with the iron(II)-containing magnetic pigments it is the loss of the magnetic properties, which is induced likewise as a result of oxidation. Particularly at risk are finely divided magnetite pigments and also mixed phases between magnetite ($Fe_3O_4$) and maghemite ($\gamma$-$Fe_2O_3$) with a high iron(II) content. Also sensitive to oxidation, however, are mixed phases of magnetite and/or ferrites, such as cobalt ferrite, for example, and those magnetic pigments which are composed of a core of $Fe_3O_4$ and $\gamma$-$Fe_2O_3$ that is surrounded by a shell of magnetic metal oxides—particularly of iron and of cobalt. In the technical literature one finds, besides the mixed phase designation, the expression "berthollides" for the compositions described here.

2. Brief Description of the Prior Art

DE 27 44 598 A1 discloses reducing the oxidation sensitivity of finely divided ferrimagnetic magnetite particles by treatment with heterocyclic organic compounds. This treatment provides a considerable improvement over the untreated pigments, but one which cannot be raised above a certain level. Morpholine, N-(3-aminopropyl)morpholine, N-(2-hydroxyethyl)piperazine, 1,2,4-triazole and 3-amino-1,2,4-triazole have proved to be particularly effective. The heterocycles used are merely physisorbed on the pigment and are therefore among the water-soluble constituents. This may result in incompatibilities in different binder systems. The magnetite particles are treated with the heterocyclic organic compound, moreover, under a non-oxidizing atmosphere, and the presence of air must be ruled out. The process is therefore costly and complicated.

DE 41 39 052 A1 discloses iron oxide pigments which in order to increase the stability towards atmospheric oxidation are coated with cyclic carboxylic hydrazides of the general formula

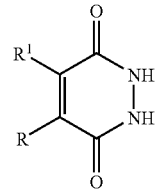

Preference is given to using "phthalic hydrazide" and "maleic hydrazide". When looked at more closely, however, all of the compounds of the general formula given above are merely 3,6-dihydroxy-substituted derivatives of pyridazine, since for the compounds of the general formula given above the following tautomeric form exists:

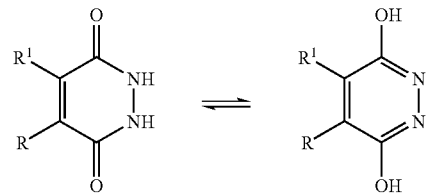

For "phthalic hydrazide" and "maleic hydrazide", therefore, the names 1,4-dihydroxyphthalazine and 3,6-dihydroxypyridazine, respectively, are also customary. Thus the cyclic carboxylic hydrazides disclosed in DE 41 39 052 A1 are simple nitrogen-containing heterocycles. As already mentioned above, these are merely physisorbed on the pigment and are therefore included among the water-soluble constituents. This may result in incompatibilities in different binder systems.

DE 37 26 048 A1 describes a coating of iron oxide pigments with derivatives of benzoic acid conforming to the general formula

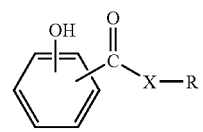

where

X=O or NH and

R=an optionally substituted linear or branched alkyl or alkylene radical having 1 to 30 carbon atoms or an optionally substituted cycloalkyl radical having 5 to 12 carbon atoms or an optionally substituted aryl radical having 5 to 10 carbon atoms or hydrogen. Particular preference is given to salicylic esters containing aliphatic alcohol components having 2 to 18 carbon atoms, such as octyl salicylate or dodecyl salicylate, for example. The derivatives of benzoic acid of the general formula that are used are merely physisorbed on the pigment and are therefore included among the water-soluble constituents. This may result in incompatibilities in different binder systems.

The prior art also describes numerous inorganic coatings, and coatings of mixtures of organic and inorganic substances, for the purpose of enhancing the oxidation stability of iron oxide pigments.

DE 32 11 327 A1, for instance, describes aftertreatment with boron-containing compounds. Those contemplated include ortho-boric acid, tetra-boric acid, meta-boric acid, glassy diboron trioxide, crystalline diboron trioxide, trimethyl borate, triethyl borate, complexes of boric acid with polyhydroxy compounds, and salts of boric acids, such as $NH_4B_5O_8 \cdot 4H_2O$, $Na_2B_4O_6 \cdot 10H_2O$, $CaB_3O_5OH \cdot 2H_2O$ or $NaBO_2$, for example. As well, boron/nitrogen compounds or boron-sulphur compounds are mentioned. Preference as boron compounds is given to using boron oxides, boric acids and/or salts of boric acids, with particular preference ortho-boric acid and/or diboron trioxide. In the examples disclosed, pulverized ortho-boric acid and pulverized diboron trioxide are added. The oxidation stability of the pigments stabilized with boric acid is comparable with that of the pigments coated with heterocyclic compounds, with a reduction in the water-soluble fractions at the same time.

DE 43 22 886 A1 discloses iron oxide pigments which have been coated with oxides or hydroxides of boron, of aluminum and/or of silicon, and also with aromatic carboxylic acids of the general formula $$Ar-(COOX)_n$$

where Ar is an aromatic optionally substituted by halogen, $NH_2$, OH, $NHR$, $NR_2$, OR or R, in which R is a linear or branched alkyl radical having 1 to 30 carbon atoms or an optionally substituted aryl radical having 6 to 10 carbon atoms, and X is hydrogen, alkali metal, $NR^1_4$ with $R^1=H$, alkyl and/or aryl, ½ alkaline earth metal, ⅓ Al or ⅓ Fe, and n is an integer from 1 to 10. In the examples disclosed, mixtures of boric acid and benzoic acid or of boric acid and 4-hydroxybenzoic acid are added.

A committee of experts of the European Union has proposed classing boric acid, borates of ortho-boric acid, such as $Na_3BO_3$, and of tetra-boric acid, such as $Na_2B_4O_6 \cdot 10H_2O$ or $Na_2B_4O_6 \cdot 5H_2O$, for example, and also diboron trioxide, as toxic to reproduction in category 2 (substances which on the basis of clear findings from animal experimentation or of other relevant information should be regarded as embryotoxic or as impairing fertility in humans) and as "toxic" (hazard symbol T) (see the Summary Record of a consultation in connection with the EU "Commission Working Group of Specialized Experts in the Field of Reprotoxicity", Ispra, 5-6 Oct. 2004—date of Record: 22 Nov. 2004). On 8 Sep. 2005 the EU Technical Committee "Classification and Labeling" dealt conclusively with the compounds specified above. By a majority decision the recommendation of the committee of experts was followed, and for these classes of substance the classification "toxic to reproduction category 2" recorded. The R phrases that apply are 60 (May impair fertility) and 61 (May cause harm to the unborn child), and also the hazard symbol T ("toxic") applies (see Summary Record of the meeting of EU Technical Committee "Classification and Labelling", Arona, 8 Sep. 2005). Handling these substances, or using them in a production operation for stabilizing the iron (II)-containing iron oxide pigments, therefore requires corresponding measures in order to protect employees and the environment. For this reason the replacement of the above-mentioned compounds is desirable.

It was an object of the present invention, therefore, to provide oxidation-stable iron(II)-containing iron oxide pigments whose oxidation stability is at least as good as that of boron-containing iron oxide pigments but which can be prepared in one step, without the use of inorganic substances, using commercially customary organic substances.

SUMMARY OF THE INVENTION

This object has been achieved by means of iron oxide pigments having an iron(II) content of at least 5% by weight, calculated as FeO, and having an organic coating, characterized in that the organic coating is composed of one or more compounds of the general formula (I)

$$R-(COOX)_n$$

where
R is a saturated or unsaturated linear or branched aliphatic radical having 1 to 15 carbon atoms which is optionally substituted one or more times by halogen and/or $NH_2$ and/or OH and/or $NHR^1$ and/or $NR^1_2$ and/or $OR^1$, or
is an alicyclic or aromatic radical having 4 to 26 carbon atoms which is optionally substituted one or more times by halogen and/or $NH_2$ and/or OH and/or $NHR^1$ and/or $NR^1_2$ and/or $OR^1$ and/or $R^1$,
$R^1$ being a saturated or unsaturated linear or branched optionally substituted aliphatic radical having in each case 1 to 10 carbon atoms or an optionally substituted alicyclic or aromatic radical having in each case 6 to 10 carbon atoms;
X is hydrogen, alkali metal, $NR^2_4$, $R^2$ being H or a linear or branched aliphatic, alicyclic or aromatic radical, or ½ alkaline earth metal, ⅓ Al or ⅓ Fe and
n is an integer from 1 to 10 and the iron oxide pigments have an oxidation stability in the oxidation stability test of $\geq 110°$ C. as compared with the uncoated iron oxide pigment. The oxidation stability is determined in accordance with the oxidation stability test, which is disclosed in the examples.

DETAILED DESCRIPTION OF THE INVENTION

The iron oxide pigments have, for example, an oxidation stability of $\geq 20°$ C. as compared with the uncoated iron oxide pigment.

By "aliphatic" are meant, in the context of the invention, compounds whose carbon atoms—in contrast to the isocyclic compounds, where the carbon atoms form rings—are arranged in chains. Consequently aliphatic compounds are equated with the acyclic compounds, subgroups of which are the alkanes, alkynes or alkenes with unbranched or branched chains.

By "alicyclic" are meant, in the context of the invention—as already indicated by the identification formed by drawing together the two terms "aliphatic" and "cyclic"—compounds whose carbon atoms are arranged in rings. Alicyclic is therefore also a synonym for cycloaliphatic. Consequently alicyclic compounds belong to the group of isocyclic compounds and thus encompass cycloalkanes, cycloalkenes and cycloalkynes. Aromatic compounds and heterocyclic compounds, and also the saturated representatives of the heterocyclic compounds, are not considered alicyclic within the meaning of this invention.

By "aromatic" are meant, in the context of the invention, merely carbocyclic aromatic compounds, in which the ring members are composed only of carbon atoms. They include, among others, benzene and also compounds containing two or more fused benzene rings, such as naphthalene, anthracene or phenanthrene, for example. Heterocycles in which not exclusively carbon atoms are arranged in the ring or in rings are not considered aromatic within the meaning of this invention.

Within the meaning of this invention the alicyclic and aromatic compounds can also be summarized under the generic heading of "carbocycles", since in both cases the ring members consist only of carbon atoms.

The organic coating is, for example, composed of a compound of the general formula (I) in which R is a saturated linear or branched aliphatic radical having 1 to 15 carbon atoms or 1 to 8 carbon atoms.

The organic coating is, for example, composed of a compound of the general formula (I) in which R is an aromatic radical having 6 to 14 carbon atoms which derives from benzene, naphthalene or anthracene.

The organic coating is, for example, composed of a compound of the general formula (I) in which X is hydrogen, $NR^2_4$, in which $R^2$ is H or a linear or branched aliphatic, alicyclic or aromatic radical, or an alkali metal such as sodium or potassium.

The organic coating is composed, for example, of a compound of the general formula (I) where n is an integer $\leq 5$, or $\leq 3$. The organic compounds of the general formula (I) therefore possess one or more carboxylate or carboxylic acid groups. This group or groups may serve as anchor function, so that the organic compounds of the general formula (I) are capable as well of forming ionic bonds to the surface of the iron oxide pigment.

The organic compounds of the general formula (I) are used, for example, in the form of the acid anhydrides. The acid anhydrides may undergo hydrolysis with the residual moisture still present on the pigment surface, to give the corresponding carboxylic acids.

The organic compounds of the general formula (I), for example, further comprise water as well and are used in the form of their hydrates.

Organic compounds used are, for example, benzoic acid, phthalic acid, isophthalic acid, acetates and/or phthalic anhydride.

The organic compounds of the general formula (I) are present, for example, in an amount of 0.1% to 10% by weight or of 0.2% to 3% by weight, in the coated pigment.

For the typical black iron oxide pigments with an iron(II) content of between 17% and 28% by weight, calculated as FeO, and with specific surface areas of less than 23 m$^2$/g, measured by means of the BET nitrogen single-point adsorption method (DIN 66131/ISO 9277), the organic compounds of the general formula (I) are present, for example, in an amount of 0.1% to 10% by weight, or of 0.2% to 5% by weight or of 0.2% to 3% by weight, in the coated pigment.

The pigments used for magnetic signal storage are more finely divided than the black iron oxide pigments (BET surface areas—determined by the nitrogen single-point adsorption method—greater than 23 m$^2$/g) and for a given iron(II) content, in accordance with their specific surface area, which may easily exceed 40 m$^2$/g, require greater added amounts of the organic compounds of the general formula (I).

If the iron(II) content is lower, as may be the case, for example, with the magnetic iron oxide compounds described above that are encased with magnetic metal oxides, then the added amount can be lowered accordingly. The treatment amount needed in each individual case in order to achieve the desired oxidation stability is otherwise readily determinable by a person skilled in the art with the aid of a number of trial attempts in accordance with the disclosed oxidation stability test.

The iron oxide pigments, for example, have a residual moisture content of <5% by weight or of <3.5% by weight. This can be achieved where appropriate by subsequent drying.

The thermally stable iron oxide pigments of the invention are in the form either of a powder or of granules. By "granules" are meant, in the context of the invention, any material whose average particle size has been enlarged as compared with the starting materials by means of a treatment step. "Granules" therefore encompass not only spray granules and compacting granules but also, for example, products of a wet or humid treatment with subsequent comminution, and products of dry or substantially dry processing steps, such as dry-produced granules, briquettes and the like, for example. In the case of granules at least 85% of particles have a size in the range from 60 μm to 3000 μm, for example from 80 μm to 1500 μm.

The invention also relates to a process for preparing iron oxide pigments, characterized in that iron oxide pigments having an Fe(II) content of at least 5% by weight, calculated as FeO, are mixed with at least one compound of the general formula (I) and the mixture is optionally dried and/or ground, the resulting iron oxide pigments having an oxidation stability in the oxidation stability test of $\geq 10°$ C. as compared with the uncoated iron oxide pigment. The iron oxide pigments of the invention can be prepared either starting from dry pigment or else in the wet phase (suspension or paste). Iron oxide pigments having an Fe(II) content of at least 5% by weight, calculated as FeO, are, for example, mixed in a suspension or paste with at least one compound of the general formula (I) and the mixture is dried and optionally ground, the resulting iron oxide pigments having an oxidation stability in the oxidation stability test of $\geq 10°$ C. as compared with the uncoated iron oxide pigment.

The pigment suspension is, for example, a suspension or paste from the pigment production operation.

The pigment suspension is, for example, a renewed dispersion of agglomerated particles.

The iron oxide pigments are, for example, exposed concluding to a temperature treatment at 200° C. to 800° C. in a non-oxidizing or weakly oxidizing atmosphere.

The iron oxide pigments for stabilization, with an iron(II) content of at least 5% by weight, calculated as FeO, may be color pigments such as black iron oxide and/or brown iron oxide, or alternatively may be magnetic pigments such as magnetite or mixed phases of magnetite with maghemite and/or ferrites, or iron oxides and/or magnetites enveloped with magnetic metal oxides and having an oxidation status between magnetite and maghemite.

The preparation of iron(II)-containing iron oxide pigments is described in the literature. They are obtainable through many processes. On the industrial scale, black iron oxide pigments are produced principally by two processes (Ullmann's Encyclopedia of Industrial Chemistry, 5th edition, volume A20, page 297, VCH Verlagsgesellschaft mbH, Weinheim 1992): the precipitation process, in which iron(II) salt solutions are precipitated with alkalis in the vicinity of the neutral point, with introduction of air at around 90° C., until the desired Fe(III)/Fe(II) ratio has been reached, and the Laux process, in which nitrobenzene is reduced with metallic iron to aniline, and which can be controlled so as to produce strongly colored black iron oxide pigments.

Depending on the production process and the purity of the raw materials used it is possible for black iron oxide pigments to contain secondary constituents such as $SiO_2$ or $Al_2O_3$, for example, in varying amounts, commonly up to 5% by weight. Normally the Fe(III)/Fe(II) ratio is also above the theoretical figure of 2.

Brown iron oxide pigments containing iron(II) are produced in by far the greatest part by mixing yellow iron oxide and/or red iron oxide with black iron oxide (Ullmann's Encyclopedia of Industrial Chemistry; see above).

The most common starting point for producing iron(II)-containing magnetic iron oxide pigments (Ullmann's Encyclopedia of Industrial Chemistry, 5th edition, volume A20, page 330, VCH Verlagsgesellschaft mbH, Weinheim 1992) is $\alpha$-FeOOH or $\gamma$-FeOOH, which is dried, dewatered and reduced with hydrogen at 350° C. to 600° C. to form $Fe_3O_4$; mixed phases of magnetite and maghemite can be obtained by partial oxidation of the magnetic pigments under gentle conditions. Mixed-phase pigments ("berthollides") of magnetite with maghemite and/or ferrites are typically produced by coprecipitating ferrite-forming metals, such as Zn, Mn, Co, Ni, Ca, Mg, Ba, Cu or Cd, as oxides or hydroxides, during the production of the FeOOH precursors, or by applying them to ready-produced FeOOH pigments, and by carrying out conversion of the pigments. Those specific magnetic pigments which are produced by applying a coating of magnetic metal oxides, for example, of iron and of cobalt, to a core of $Fe_3O_4$ or an iron oxide having an oxidation status between $Fe_3O_4$ and $\gamma$-$Fe_2O_3$, can also be protected.

In accordance with the first process of the invention the iron(II)-containing iron oxide pigments, prepared in conventional manner, are mixed with at least one organic compound of the general formula (I). The organic compounds are advantageously brought into a finely divided state beforehand. Alternatively they can be admixed in the form of a solution or suspension in an aqueous and/or organic medium. Mixing can be carried out using typical industrial apparatus, such as pneumatic mixers, paddle mixers, screw mixers, drum mixers or cone mixers, for example. Mixing may take place at room temperature or else at temperatures higher than room temperature. Mixing is generally operated in the presence of air, although if using relatively high temperatures the use of inert gases, such as nitrogen, for example, may be of advantage. If only small amounts of one or more organic compounds of the general formula (I) are being mixed with large amounts of pigment, then it may be advantageous to produce a premix. The mixture obtained is then ground if desired. Grinding units of different construction are suitable for this purpose, such as roll mills, edge runner mills, pendulum mills, hammer mills, pinned-disc mills, turbo mills, ball mills or jet mills, for example. Milling may be carried out at room temperature or at higher temperatures than room temperature, where appropriate under inert gases, such as nitrogen, for example. Where appropriate, heat treatment takes place subsequently at temperatures up to 800° C. in an atmosphere which is inert or contains only small amounts of oxygen.

In accordance with the second process of the invention the iron(II)-containing iron oxide pigments, prepared conventionally, are mixed first in suspension or paste with at least one organic compound of the general formula (I). Adding the organic compounds in the wet phase is advantageous, since in the suspension it is easy to add and mix-in the organic compounds of the general formula (I). The suspension medium used is generally water, although in principle the use of aqueous/organic or purely organic media is also possible. The pigment suspension or paste is, for example, a suspension from the pigment production operation. The organic compounds of the general formula (I) can be added to the suspension at any desired point in time before, during or after pigment production. Alternatively the pigment suspension may be a renewed dispersion of particles which have already undergone agglomeration, in order, starting from pigment powder, to prepare, in a controlled way, a pigment suspension for treatment with at least one organic compound of the general formula (I). Treatment may be performed in all cases at room temperature or at a higher temperature, where appropriate under an inert gas atmosphere. The treatment time is, for example, one minute to several hours. The treated pigment is dried in a further process step. For the drying step the person skilled in the art has a range of assemblies available. Mention is made at this point only of duct driers, belt driers, platform driers, cylinder driers, drum driers, tube driers, paddle driers, or else discontinuous chamber-tray driers. Drying is accomplished, for example, by spray drying or fluidized-bed drying. Preference is given to using spray driers (atomizing driers) which operate, for example, with spraying discs or spraying nozzles in a cocurrent or countercurrent process. Depending on the drying assembly selected it may be necessary to include a subsequent grinding step. As in the case of the first process, the coated, dried pigment is then optionally ground and optionally subsequently heat-treated at temperatures up to 800° C. in an atmosphere which is inert or contains only small amounts of oxygen.

One advantage of the production processes of the invention is that the precipitation of an after-treatment substance, and indeed a multi-stage synthesis process for the aftertreatment, are unnecessary when preparing the oxidation-stable iron oxide pigments of the invention.

Oxidation-stable iron(II)-containing iron oxide pigments which are mixtures of different iron oxide color pigments are advantageously produced, on cost grounds, such that only those components of the mixture that contain divalent iron are protected by one of the two processes of the invention against oxidation, and only then are the pigments mixed with the other iron oxide pigments. It is of course also possible, however, to subject the mixture of iron(II)-containing iron oxide color pigments and iron(II)-free iron oxide color pigments as a whole to one of the two processes of the invention.

It is not essential to the invention whether the oxidation-stable iron oxide pigments of the invention are in powder form or in granulated form. If the oxidation-stable iron oxide pigments are to be produced in granulated form, then the customary techniques are suitable for this purpose. In accordance with the prior art, suitable production processes for pigment granules include spray granulation (spray drying via disc or nozzle) in a cocurrent or countercurrent process, size-enlargement granulation (mixer, fluidized-bed granulator, plate or drum), compacting processes or extrusion processes. Combinations of these granulation processes are of course also conceivable. The selection of the appropriate granulation process depends on factors including that of whether the organic compound of the general formula (I) has been added actually in the wet phase (suspension or paste) or to the pigment which has already undergone drying. In the former case the spray drying or extrusion process is appropriate, in the latter case the compacting process. Oxidation-stable iron oxide pigments are, for example, subjected in the dry and optionally ground state to a subsequent granulating operation as well.

The invention also relates to the use of the iron oxide pigments for coloring lime- and/or cement-bound building materials, for coloring plastics, varnishes, emulsion paints, and for producing magnetic recording media and toners.

The lime- and/or cement-bound building materials are, for example, concrete, cement mortar, plaster and/or sand-lime brick. The iron oxide pigments are mixed with the building materials in an amount of 0.1% to 10% by weight, based on cement. Alternatively they may first be suspended in water and then mixed with the building materials.

The iron oxide pigments can be used with advantage for manufacturing magnetic recording materials of any kind, such as, for example, audio and video tapes, instrumentation tapes, computer tapes, magnetic cards, flexible magnetic discs, rigid magnetic discs or drum memories.

The subject matter of the present invention is apparent not only from the subject matter of the individual claims but also from the combination of the individual claims with one another. The same applies to all of the parameters disclosed in the description and to any desired combinations thereof.

The examples which follow elucidate the invention in more detail, without any intention that they should constitute a restriction on the invention. The present invention has been described with reference to specific details of particular embodiments thereof. It is not intended that such details be regarded as limitations upon the scope of the invention except insofar as and to the extent that they are included in the accompanying claims.

EXAMPLES

I. Description of Measurement Methods Used

I.1 Oxidation Stability Test

The oxidation stability testing took place via a method based on a test method for substances subject to oxidative self-heating, the method being described in the "Recommendations on the Transport of Dangerous Goods—Manual of Tests and Criteria" of the United Nations in the third, revised edition of the German translation of the Bundesanstalt für Materialforschung und-prüfung in part III, section 33.3.1.6.1 to 33.3.1.6.3, page 338.

Oven: an oven with hot-air circulation and an internal volume of more than 9 l, furnished such that it is able to maintain the internal setpoint temperature to a precision of ±2° C.

Sample holder: cubic sample holders with an edge length of 10 cm made from stainless-steel wire mesh with a mesh size of 350 mesh and an open top face. This sample holder must be inserted into a cubic protective holder with an edge length of 10.8 cm, made from stainless-steel wire with a mesh size of 8 mesh. At the top corners the sample holder has small mounting rods, so that it can be suspended freely and centrally in the protective holder. The protective holder stands on legs, so that it can be placed in the middle of the drying chamber.

Temperature measurement: temperature detection in the sample is accomplished by means of a jacketed NiCrNi thermocouple with a diameter of 1.5 mm. This thermocouple shall be arranged in the centre of the sample. Temperature detection and regulation of the oven are carried out via a platinum resistance thermometer PT 100, which projects into the oven chamber and is arranged between sample holder and oven wall. The two temperatures shall be measured continuously.

Sample preparation: the powderous or granulated sample should first be introduced to the halfway point in the sample holder, and the holder should be gently compressed three times from a height of approximately 3 cm. The sample holder is then filled to the brim with the powderous or granulated sample, and again the holder should be gently compressed three times from a height of around 3 cm. If the sample settles, it should be topped up to the brim. The sample holder shall be inserted centrally into the protective holder, and the protective holder shall be placed in the middle of the oven.

Test conditions: the oven temperature is first set to a setpoint temperature of 120° C. and maintained for at least 20 hours. The temperature in the interior of the sample shall be recorded. If the temperature in the sample exceeds the oven temperature by 60° C. during the period of the test, then the result of the oxidation stability test is positive, since self-heating has occurred in the sample as a result of oxidation. In such a case the oxidation stability test is carried out again with a newly prepared sample at an oven setpoint temperature reduced by 10° C. This procedure shall be repeated until the test yields a negative result, i.e. the temperature in the interior of the sample does not exceed the oven temperature by 60° C. during the period of the test, so that there is no self-heating of the sample as a result of oxidation—associated with a temperature increase of more than 60° C. If the test yields a negative result for an oven setpoint temperature even of 120° C., then the oxidation stability test is carried out again with a newly prepared specimen at an oven setpoint temperature increased by 10° C. This process shall be repeated until the oxidation stability test produces a positive result. The maximum attained oven setpoint temperature for which the oxidation stability test still just produces a negative result, i.e. at which the sample is stable towards oxidation, is taken to be the oxidation stability/thermal stability for the pigment under investigation. This temperature is reported for the respective examples and in Tables 1 to 3.

I.2 Building-material Color Test

The testing of the color values in building materials was carried out in cement mortar via the calorimetric measurement of prisms produced using white cement, with the following data:

Cement/quartz sand ratio 1:4, water/cement value 0.35, pigmentation level 1.2%, based on cement, mixer used from RK Toni Technik, Berlin, with 5 l mixing bowl, model 1551, speed 140 rpm, batch: 1200 g of quartz sand 0.1 to 1 mm, 600 g of quartz sand 1 to 2 mm, 200 g of finely ground limestone (<5% residue on 90 μm sieve), 500 g of white cement. The quartz sand fractions and the finely ground limestone are placed together in the mixing vessel. Then the pigment is added and the mixture is premixed for 10 s (mixer setting 1: slow). Then the water is added to this mixture, ensuring that it is introduced into the middle of the mixture. After the water has seeped into the mixture, the cement is added and mixing carried out (mixer setting 1: slow). After a mixing time of 100 s a sample (600 g) is taken and used to produce a test specimen (10×10×2.5 cm) under pressure (pressing force 114 kN for 2 seconds). Colorimetric data are measured using a Minolta Chromameter 310 with 4 measuring points per block (measurement geometry d/8°, illuminant C/2° with gloss inclusion). The average values obtained are compared with the values for a reference specimen (uncoated pigment from Example 1 for the samples in Table 1, or uncoated pigment from Example 9 for the samples in Table 3). Assessments are made of the total color difference $\Delta E_{ab}^*$ and of the relative color strength (reference sample=100%) (DIN 5033, DIN 6174). The total color difference $\Delta E_{ab}^*$ here is calculated in accordance with $$\Delta E_{ab}^* = [(\Delta L^*)^2 + (\Delta a^*)^2 + (\Delta b^*)^2]^{1/2},$$

the abbreviations—which are known from the CELAB system—that apply being as follows:

a* corresponds to the red-green axis with $\Delta a^* = a^*$(sample)−a*(reference)

b* corresponds to the yellow-blue axis with Δb*=b*(sample)−b*(reference)

L* corresponds to the luminance with ΔL*=L*(sample)−L*(reference)

I.3 Relative Color Strength

For the relative color strength in %, the following equations apply:

$$\text{Relative color strength in \%} = \frac{(K/S)_{sample}}{(K/S)_{reference}} \cdot 100$$

$$K/S = \frac{(1-\beta^*)^2}{2 \cdot \beta^*}$$

$$\beta^* = \frac{Y/100 - r_0}{1 - r_0 - r_2 \cdot (1 - Y/100)},$$

where $r_0=0.04$ and $r_2=0.6$ and Y is the tristimulus value (luminance).

The calculation is made with reference to DIN 53 234.

I.4 Residual Moisture Content

The residual moisture content was determined by gently drying the (coated) pigment to constant weight.

I.5 Compressive Strength

The compressive strength was determined by a method based on DIN EN 196-1. This test tests the compressive strength of pigmented cement mortar in comparison to an unpigmented sample, and the deviations must not be greater than as specified in DIN EN 12878 "Pigments for coloring lime-bound and/or cement-bound building materials" (at most −8% for reinforced concrete).

I.6 Solidification Behavior

The solidification behavior was determined by a method based on DIN EN 196-3. The beginning of solidification and the end of solidification of a cement slurry with and without pigmentation are compared with one another, the differences required not to be greater than specified in DIN EN 12878.

II. Example 1

Comparative Example Without Coating Substance

A black iron oxide pigment produced by the Laux process, having a BET of 12.0 m²/g and an FeO content of 23.4%, was treated to separate off the aniline, filtered, washed salt-free, dried on a spray drier with spraying disc, and ground on a Bauermeister mill with a 1 mm screen insert. The pigment obtained was subjected to the oxidation stability test and further tests. The results are summarized in Table 1.

III. Example 2

Comparative Examples, Produced in Accordance with the Prior Art 5 kg portions of the dried black iron oxide pigment from Example 1 were admixed in a mixer with 75 g (corresponding to 1.5% by weight) of pulverized ortho-boric acid (Example 2a) or with 75 g (corresponding to 1.5% by weight) of a 1:1 powder mixture of benzoic acid and ortho-boric acid (Example 2b), mixed for 15 minutes and then ground on a Bauermeister mill with a 1 mm screen insert. The coated pigments obtained in each case were subjected to the oxidation stability test and further tests. The results are summarized in Table 1.

IV. Example 3

5 kg portions of the dried black iron oxide pigment from Example 1 were admixed in a mixer with 75 g (corresponding to 1.5% by weight) of different pulverized organic compounds of the general formula (I), mixed for 15 minutes and then ground on a Bauermeister mill with a 1 mm screen insert. The coated pigments obtained in each case were subjected to the oxidation stability test and further tests. The results are summarized in Table 1.

V. Example 4

Comparative Examples, Produced in Accordance with the Prior Art 5 kg portions of the dried black iron oxide pigment from Example 1 were admixed in a mixer with 125 g (corresponding to 2.5% by weight) of pulverized ortho-boric acid (Example 4a) or with 125 g (corresponding to 2.5% by weight) of a 1:1 powder mixture of benzoic acid and ortho-boric acid (Example 4b), mixed for 15 minutes and then ground on a Bauermeister mill with a 1 mm screen insert. The coated pigments obtained in each case were subjected to the oxidation stability test and further tests. The results are summarized in Table 1.

VI. Example 5

5 kg portions of the dried black iron oxide pigment from Example 1 were admixed in a mixer with 125 g (corresponding to 2.5% by weight) of different pulverized organic compounds of the general formula (I), mixed for 15 minutes and then ground on a Bauermeister mill with a 1 mm screen insert. The coated pigments obtained in each case were subjected to the oxidation stability test and further tests. The results are summarized in Table 1.

VII. Example 6

Comparative Example without Coating Substance

A black iron oxide pigment produced by the Laux process, having a BET of 15.5 m²/g and an FeO content of 17.5%, was synthesized, treated to separate off the aniline, then filtered and washed salt-free. The filter cake was slurried with water to give a paste with a solids content of 50%. 10 kg of this black iron oxide paste were dried without any additions whatsoever, precomminuted on a shredder with a mesh size of 3 mm in a drying cabinet, and finally ground on a Bauermeister mill with a 1 mm screen insert. The pigment obtained was subjected to the oxidation stability test. The results are summarized in Table 2.

VIII. Example 7

Comparative Examples, Produced in Accordance with the Prior Art 10 kg of the slurried black iron oxide paste from Example 6 were admixed with 75 g of a 1:1 mixture of benzoic acid and ortho-boric acid (corresponding to 1.5% by weight), stirred for 15 minutes, dried in a drying cabinet, precomminuted on a shredder with a mesh size of 3 mm, and finally ground on a Bauermeister mill with a 1 mm screen insert. The pigment obtained was subjected to the oxidation stability test. The results are summarized in Table 2.

IX. Example 8

10 kg portions of the slurried black iron oxide paste from Example 6 were admixed with 75 g of different organic compounds of the general formula (I) (corresponding to 1.5% by weight), stirred for 15 minutes, dried in a drying cabinet, precomminuted on a shredder with a mesh size of 3 mm, and finally ground on a Bauermeister mill with a 1 mm screen insert. The pigments obtained in each case were subjected to the oxidation stability test. The results are summarized in Table 2.

X. Example 9

Comparative Example without Coating Substance

A black iron oxide pigment produced by the Laux process was synthesized, treated to separate off the aniline, then filtered and washed salt-free. The filter cake possessed a solids content of 66.7% by weight and was dried without any additions whatsoever. The solid obtained was precomminuted on a shredder with a mesh size of 3 mm, and then ground on a Bauermeister mill with a 1 mm screen insert. The pigment obtained had a BET of circa 21 $m^2/g$ and an FeO content of 21.1%. It was subjected to the oxidation stability test and to the building-material color test. The results are summarized in Table 3.

XI. Example 10

In each case 7.5 kg of the washed black iron oxide filter cake of 66.7% by weight solids content from Example 9 were slurried with 2.5 kg of water to give a paste having a solids content of 50% by weight. The paste was admixed with 125 g of different organic compounds of the general formula (I) (corresponds to 2.5% by weight), stirred for 15 minutes, dried, precomminuted on a shredder with a mesh size of 3 mm, and then ground on a Bauermeister mill with a 1 mm screen insert. The pigments obtained in each case were subjected to the oxidation stability test and to the building-material color test. The results are summarized in Table 3.

XII. Example 11

Comparative Example Without Coating Substance

A black iron oxide pigment produced by the precipitation process from iron(II) sulphate was synthesized, filtered and washed salt-free. The filter cake was slurried to give a suspension having a solids content of 22.8% by weight. The suspension was divided and one part was dried without any additions whatsoever. The solid obtained was precomminuted on a shredder with a mesh size of 3 mm and then ground on a Bauermeister mill with a 1 mm screen insert. The pigment obtained had a BET of 18.2 $m^2/g$ and an FeO content of 20.6%. It was subjected to the oxidation stability test and found to have an oxidation stability of 80° C.

XIII. Example 12

19.3 kg of the suspension described in Example 11, with a solids content of 22.8% by weight, were admixed with 110 g of isophthalic acid (corresponding to 2.5% by weight), stirred for 15 minutes and dried. The solid obtained was precomminuted on a shredder with a mesh size of 3 mm and then ground on a Bauermeister mill with a 1 mm screen insert. The coated pigment obtained gave an oxidation stability of 100° C. in the oxidation stability test.

TABLE 1

| Example | Added organic compound of the general formula (I) | Oxidation stability [° C.] | Residual moisture content [%] | Relative colour strength [%] | Total colour difference $\Delta E_{ab}^*$ | Compressive strength | Solidification behaviour |
|---|---|---|---|---|---|---|---|
| 1) | none | 120 | 3.6 | 100 (reference) | 0.0 (reference) | complies | complies |
| 2a) | 1.5% by weight ortho-boric acid | 140 | 2.2 | 105 | 0.5 | complies | complies |
| 2b) | 1.5% by weight 1:1 mixture of benzoic acid/ortho-boric acid | 140 | 1.0 | 105 | 0.4 | complies | complies |
| 3a) | 1.5% by weight maleic acid, disodium salt | 140 | 3.4 | 103 | 0.3 | complies | complies |
| 3b) | 1.5% by weight sodium acetate trihydrate | 140 | 2.1 | 99 | 0.2 | complies | complies |
| 3c) | 1.5% by weight phthalic acid | 140 | 1.0 | 98 | 0.2 | complies | complies |
| 3d) | 1.5% by weight 1-naphthoic acid | 140 | 1.2 | 106 | 0.5 | complies | complies |
| 3e) | 1.5% by weight naphthalene-1,4-dicarboxylic acid | 140 | 1.3 | 101 | 0.2 | complies | complies |
| 4a) | 2.5% by weight ortho-boric acid | 150 | 3.0 | 98 | 0.2 | complies | complies |
| 4b) | 2.5% by weight 1:1 mixture of benzoic acid/ortho-boric acid | 150 | 1.4 | 103 | 0.2 | complies | complies |
| 5a) | 2.5% by weight benzoic acid | 150 | 1.0 | 102 | 0.2 | complies | complies |
| 5b) | 2.5% by weight phthalic acid | 150 | 1.1 | 93 | 0.6 | complies | complies |
| 5c) | 2.5% by weight isophthalic acid | 150 | 1.5 | 100 | 0.1 | complies | complies |
| 5d) | 2.5% by weight phthalic anhydride | 150 | 1.3 | 101 | 0.2 | complies | complies |

TABLE 2

| Example | Added organic compound of the general formula (I) | Oxidation stability [° C.] | Residual moisture content [%] |
|---|---|---|---|
| 6) | none | 110 | 0.6 |
| 7) | 1.5% by weight 1:1 mixture of benzoic acid/ortho-boric acid | 120 | 0.6 |
| 8a) | 1.5% by weight benzoic acid | 120 | 0.7 |
| 8b) | 1.5% by weight succinic acid | 120 | 0.4 |
| 8c) | 1.5% by weight phthalic acid, monopotassium salt | 120 | 0.7 |
| 8d) | 1.5% by weight isophthalic acid | 120 | 0.9 |
| 8e) | 1.5% by weight terephthalic acid | 130 | 0.4 |
| 8f) | 1.5% by weight 1,3,5-benzenetricarboxylic acid | 120 | 1.5 |
| 8g) | 1.5% by weight phthalic anhydride | 130 | 0.6 |

TABLE 3

| Example | Added organic compound of the general formula (I) | Oxidation stability [° C.] | Relative color strength [%] | Total color difference $\Delta E_{ab}^*$ |
|---|---|---|---|---|
| 9) | none | 100 | 100 (reference) | 0.0 (reference) |
| 10a) | 2.5% by weight sodium acetate trihydrate | 120 | 99 | 0.2 |
| 10b) | 2.5% by weight phthalic anhydride | 120 | 92 | 0.8 |
| 10c) | 2.5% by weight isophthalic acid | 140 | 93 | 0.7 |
| 10d) | 2.5% by weight DL-camphoric anhydride | 120 | 100 | 0.0 |
| 10e) | 2.5% by weight (1R,3S)-(+)-camphoric acid | 110 | 95 | 0.5 |

What is claimed is:

1. An oxidation-stable iron oxide pigment comprising Fe(II), said FE(II) having a content of at least 5% by weight calculated as FeO; and
a coating, said coating consists of an organic coating composed of one or more compounds of the general formula (I)

R—(COOX)$_n$ (1)

wherein
R is a saturated or unsaturated linear or branched aliphatic radical having 1 to 15 carbon atoms which is optionally substituted one or more times by halogen and/or NH$_2$ and/or OH and/or NHR$^1$ and/or NR$^1_2$ and/or OR$^1$, or
is an alicyclic or aromatic radical having 4 to 26 carbon atoms which is optionally substituted one or more times by halogen and/or NH$_2$ and/or OH and/or NHR$^1$ and/or NR$^1_2$ and/or OR$^1$ and/or R$^1$,
R$^1$ being a saturated or unsaturated linear or branched optionally substituted aliphatic radical having in each case 1 to 10 carbon atoms or an optionally substituted alicyclic or aromatic radical having in each case 6 to 10 carbon atoms;
X is hydrogen, alkali metal, NR$^2_4$, R$^2$ being H or a linear or branched aliphatic, alicyclic or aromatic radical, or ½ alkaline earth metal, ⅓ Al or ⅓ Fe and
n is an integer from 1 to 10;
wherein the iron oxide pigment has an oxidation stability in the oxidation stability test of ≧10° C. as compared with an uncoated iron oxide pigment.

2. The iron oxide pigment according to claim 1, wherein the iron oxide pigments has an oxidation stability of ≧20° C. as compared with the uncoated iron oxide pigment.

3. The iron oxide pigment according to claim 1, wherein R of the general formula (I) is a saturated linear or branched aliphatic radical having 1 to 15 carbon atoms.

4. The iron oxide pigment according to claim 3, wherein R of the general formula (I) is a saturated linear or branched aliphatic radical having 1 to 8 carbon atoms.

5. The iron oxide pigment according to claim 1, wherein R of the general formula (I) is an aromatic radical having 6 to 14 carbon atoms and is derived from benzene, naphthalene or anthracene.

6. The iron oxide pigment according to claim 1, wherein X of the general formula (I) is hydrogen NR$^2_4$, R$^2$ is H or a linear or branched aliphatic, alicyclic or aromatic radical, or an alkali metal.

7. The iron oxide pigment according to claim 6, wherein the alkali metal is sodium or potassium.

8. The iron oxide pigment according to claim 1, wherein n of the general formula (I) is an integer ≦5.

9. The iron oxide pigment according to claim 8, wherein n is an integer ≦3.

10. The iron oxide pigment according to claim 1, wherein the one or more compounds of the general formula (I) are in acid anhydride form.

11. The iron oxide pigment according to claim 1, wherein the one or more compounds of the general formula (I) additionally contains water and are in hydrate form.

12. The iron oxide pigment according to claim 1, wherein the one or more compounds of the general formula (I) comprises benzoic acid, phthalic acid, isophthalic acid, acetates and/or phthalic anhydride.

13. The iron oxide pigment according to claim 1, wherein the one or more compounds of the general formula (I) are present in an amount of 0.1% to 10% by weight.

14. The iron oxide pigment according to claim 13, wherein the one or more compounds of the general formula (I) are present in an amount of 0.2% to 3% by weight.

15. The iron oxide pigment according to claim 1, wherein the iron oxide pigment has a residual moisture content of less than 5% by weight.

16. The iron oxide pigment according to claim 15, wherein the iron oxide pigment has a residual moisture content of less than 3.5% by weight.

17. A process for preparing an oxidation-stable iron oxide pigment, comprising:
a) mixing an iron oxide pigment having an Fe(II) content of at least 5% by weight, calculated as FeO, with a coating, said coating consisting of an organic coating composed of one or more compounds of the general formula (I) as defined in claim 1,
wherein the oxidation-stable iron oxide pigment has an oxidation stability in an oxidation stability test of ≧10° C. as compared with an uncoated iron oxide pigment.

18. The process according to claim 17, further comprising:
performing mixing step in a suspension or paste, thereby forming a mixture; and
b) drying the mixture of step a).

19. The process according to claim 18, wherein the pigment suspension or paste is a suspension or paste from a pigment production operation.

20. The process according to claim 18, wherein the pigment suspension or paste is a renewed dispersion of agglomerated particles.

21. The process according to claim 17, further comprising exposing the iron oxide pigment to a temperature of between 200° C. to 800° C. in a non-oxidizing or weakly oxidizing atmosphere.

22. The process according to claim 17, further comprising drying and/or grinding the mixture of step a).

23. The process according to claim 17, further comprising grinding the mixture of step a).

24. A process for producing lime- and/or cement-bound building material, plastic, varnish, emulsion paint, magnetic recording media and/or toner each comprising the iron oxide pigment according to claim 1, comprising: mixing the iron oxide pigment with said lime- and/or cement-bound building material, plastic, varnish, emulsion paint, magnetic recording media and/or toner.

25. The process according to claim 24, wherein the lime- and/or cement-bound building material is concrete, cement mortar, plaster and/or sand-lime brick.

* * * * *